(12) United States Patent
Yun

(10) Patent No.: US 12,382,929 B2
(45) Date of Patent: Aug. 12, 2025

(54) HARNESS FOR AN ANIMAL

(71) Applicant: Yeu Hoon Yun, South Pasadena, CA (US)

(72) Inventor: Yeu Hoon Yun, South Pasadena, CA (US)

(*) Notice: Subject to any disclaimer, the term of this patent is extended or adjusted under 35 U.S.C. 154(b) by 3 days.

(21) Appl. No.: 18/375,779

(22) Filed: Oct. 2, 2023

(65) Prior Publication Data

US 2024/0407337 A1      Dec. 12, 2024

Related U.S. Application Data

(63) Continuation-in-part of application No. 18/207,029, filed on Jun. 7, 2023, now abandoned.

(51) Int. Cl.
*A01K 27/00* (2006.01)

(52) U.S. Cl.
CPC .................. *A01K 27/002* (2013.01)

(58) Field of Classification Search
CPC .................................................. A01K 27/002
USPC ......................................................... 119/863
See application file for complete search history.

(56) References Cited

U.S. PATENT DOCUMENTS

| | | | | |
|---|---|---|---|---|
| 5,531,187 A * | 7/1996 | Ward | ...................... | B62J 11/20 119/856 |
| 5,611,298 A * | 3/1997 | Sporn | .................. | A01K 27/002 119/864 |
| 6,101,979 A * | 8/2000 | Wilson | .................. | A01K 1/0272 119/725 |
| 6,662,755 B2 * | 12/2003 | Kato | ..................... | A01K 13/006 D30/152 |
| 7,357,099 B2 * | 4/2008 | Smith | .................. | A01K 27/002 119/856 |
| 7,757,641 B1 * | 7/2010 | Worden | ............... | A01K 27/002 119/856 |
| 8,166,924 B2 * | 5/2012 | Cho | ..................... | A01K 27/002 119/856 |
| 8,171,892 B1 * | 5/2012 | Horgan | ............... | A01K 27/002 119/816 |
| 8,807,091 B2 * | 8/2014 | Min | ...................... | A01K 27/002 119/856 |
| 9,247,716 B2 * | 2/2016 | Wilson | .................. | A01K 27/002 |
| 10,238,091 B2 * | 3/2019 | Hoffman | ............... | A01K 1/0263 |
| 10,390,518 B2 * | 8/2019 | Yun | ....................... | A01K 27/002 |
| 11,497,194 B2 * | 11/2022 | Guidetti | ............... | A01K 27/002 |
| 11,684,042 B1 * | 6/2023 | Leung | .................. | A44B 11/008 119/864 |
| 2004/0025804 A1 * | 2/2004 | Smith | ..................... | B60R 22/10 119/856 |
| 2006/0065210 A1 * | 3/2006 | Tozawa | ................ | A01K 27/005 119/863 |

(Continued)

*Primary Examiner* — Monica L Perry
*Assistant Examiner* — Maria E Graber
(74) *Attorney, Agent, or Firm* — PARK LAW FIRM

(57) ABSTRACT

A harness for an animal has a collar, a sternum cover, a closed loop, and a link connecting an upper section of the collar and the closed loop. The sternum cover extends from the collar to the end of the sternum cover (a sternum-cover end). The right side of the sternum cover has a right extension, and the left side of the sternum cover has a left extension. The right extension is connected to the closed loop and the left extension is connected to the closed loop. The closed loop is made of a flexible material enabling the closed loop to change its shape when pulled or pushed.

14 Claims, 4 Drawing Sheets

(56) References Cited

U.S. PATENT DOCUMENTS

| | | | |
|---|---|---|---|
| 2008/0047501 A1* | 2/2008 | Madere | A01K 27/002 |
| | | | 119/856 |
| 2008/0276880 A1* | 11/2008 | Swisher | A01K 27/002 |
| | | | 119/728 |
| 2010/0024744 A1* | 2/2010 | Baillie | A01K 27/001 |
| | | | 119/858 |
| 2011/0067648 A1* | 3/2011 | Siklosi | A01K 27/002 |
| | | | 119/863 |
| 2012/0160184 A1* | 6/2012 | Lichvar | A01K 27/002 |
| | | | 119/725 |
| 2017/0049077 A1* | 2/2017 | Ng | A01K 27/006 |
| 2018/0263218 A1* | 9/2018 | Renforth | A01K 27/005 |
| 2019/0110438 A1* | 4/2019 | Yun | A01K 27/002 |
| 2023/0200354 A1* | 6/2023 | Gilmore | A01K 27/002 |
| | | | 119/856 |
| 2023/0240267 A1* | 8/2023 | Guidetti | A01K 27/002 |
| | | | 119/863 |

* cited by examiner

HARNESS FOR AN ANIMAL

This Application claims priority of a U.S. patent application Ser. No. 18/207,029 (the "029 Application") with the filing date of Jun. 7, 2023. The entire content of the '029 Application is hereby incorporated by reference.

SUMMARY

A harness for an animal is presented herein. Various forms of animal restraints for walking pets are available in the market. Some restraints use neck collars and some restraints use harnesses. The neck collars are generally simple but chokes the animal when the restraint is applied. For example, when a leash is attached to the neck collar, the pulling on the leash restrains the animal but the restrain unfortunately chokes the animal. On the other hand, a harness used to wrap around the torso of the animal does not choke the animal, but the harness is fixed in length so the animal is uncomfortable and binding to the animal when the harness is worn.

Therefore, there is a need for a harness for an animal that would loosen the hold around the neck and torso of the animal when not pulled (that is, when a restraint is not applied), but would tighten and securely hold the animal around the torso when pulled (that is, when a restraint is applied.) The harness for an animal described herein solves the problems described above by incorporating a closed loop into the harness that adjusts flexibly to loosen the grip around the torso when not pulled upon and tightens the grip around the torso when pulled upon.

A harness for an animal presented herein has a collar, a sternum cover, a closed loop, and a link connecting an upper section of the collar and the closed loop. The link may be in the form of a strap. In fact, a strap may be a cord, a leather or corded strip or band, a flattened string, denim, fabric, nylon, flexible plastic, string, and other strapping means used in harnesses for animals.

The sternum cover extends from the collar to a sternum-cover end. The right side of the sternum cover has a right extension, and the left side of the sternum cover has a left extension. The right extension is connected to the closed loop and the left extension is connected to the closed loop. The closed loop is made of a flexible material enabling the closed loop to change its shape when pulled or pushed.

The flexible loop is thus able to have a varying loop width and a varying loop height. When a leash attached to the closed loop is not pulled tight, the closed loop is relaxed and the closed loop flattens, making the loop width wider (making the loop height shorter), making the entire harness loosely fit on the animal. When the leash attached to the closed loop is pulled tight, the closed loop is pulled and the closed loop elongates towards the pulling force, making the loop width narrower (making the loop height longer), making the entire harness tightly fit on the animal.

Because the closed loop is relaxed and as the closed loop flattens, making the loop width wider (making the loop height shorter), when the leash is not pulled, the harness is relaxedly fit over the animal and the harness hardly put any binding force on the animal, making the animal comfortable. However, when the leash is pulled, the closed loop is pulled and the closed loop elongates towards the pulling force, making the loop width narrower (making the loop height longer), making the entire harness tightly fit on the animal, pulling on the upper torso above the sternum, on the sternum, or the upper torso below the sternum of the animal, controlling and restraining the animal without choking the animal.

One advantage of the embodiment presented herein is that although the harness has a collar around the neck of the animal, the most of the controlling force of a pull does not choke the animal. Because the pulling force is distributed over the upper torso (or over the sternum), the pulling force is well distributed over the animal's body, minimizing any choking or any of the straps digging into the body of the animal due to the pressure concentrated at any one point.

The right side of the sternum cover and the left side of the sternum cover, from the collar gradually come closer to each other in an unfolded state and then gradually goes further apart in an unfolded state, forming the right extension and the left extension, respectively.

A right tab and a left tab are attached to the closed loop so that the right extension attaches to the right tab and the left extension attaches to the right tab.

The right tab and the left tab are slidably attached to the closed loop so that either or both the right tab and the left tab slide along the closed loop. The right tab has a right tab opening and the left tab has a left tab opening so that the closed loop is inserted through both the right tab opening and the left tab opening so that either or both the right tab and the left tab easily slide along the closed loop.

To better accommodate the leash, a ring is attached to the link or to the loop so that a leash can be attached to the ring. One embodiment has the link with a hole formed at an end (or at an extremity) of the link, away from the collar and next to the closed loop. A part of the ring is inserted through the hole and the ring is free to rotate about the hole.

Various versions of the harness are available. An embodiment of the harness for an animal has a right strap attached to the right extension and a left strap attached to the left extension. In this embodiment, the right strap attached to the right extension is removably attached to the right tab, and the left strap attached to the left extension is removably attached to the left tab.

An embodiment of the harness for an animal has the right strap with a right buckle used to adjust length of the right strap and the left strap with a left buckle used to adjust length of the left strap. The right buckle and the left buckle are used to adjust the harness to comfortably fit the animal.

A harness for an animal is presented, and it is better described, together with the drawings and detailed description below.

BRIEF DESCRIPTION OF THE DRAWINGS

These and other features, aspects, and advantages of the harness for an animal will become better understood with reference to the accompanying drawings, wherein.

DETAILED DESCRIPTION

Figure 1:
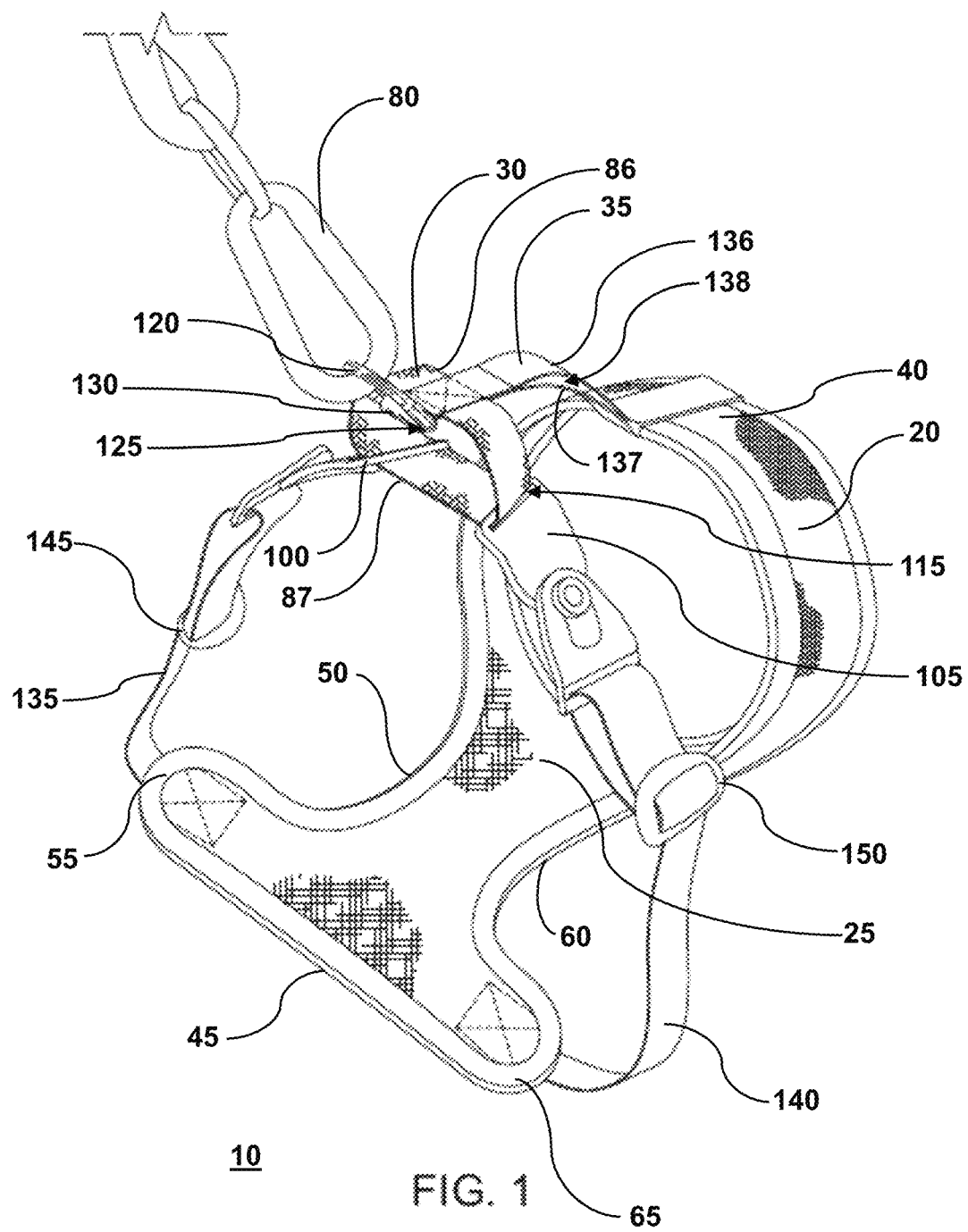
FIG. 1 is an isometric view of the harness for an animal.
Figure 2:
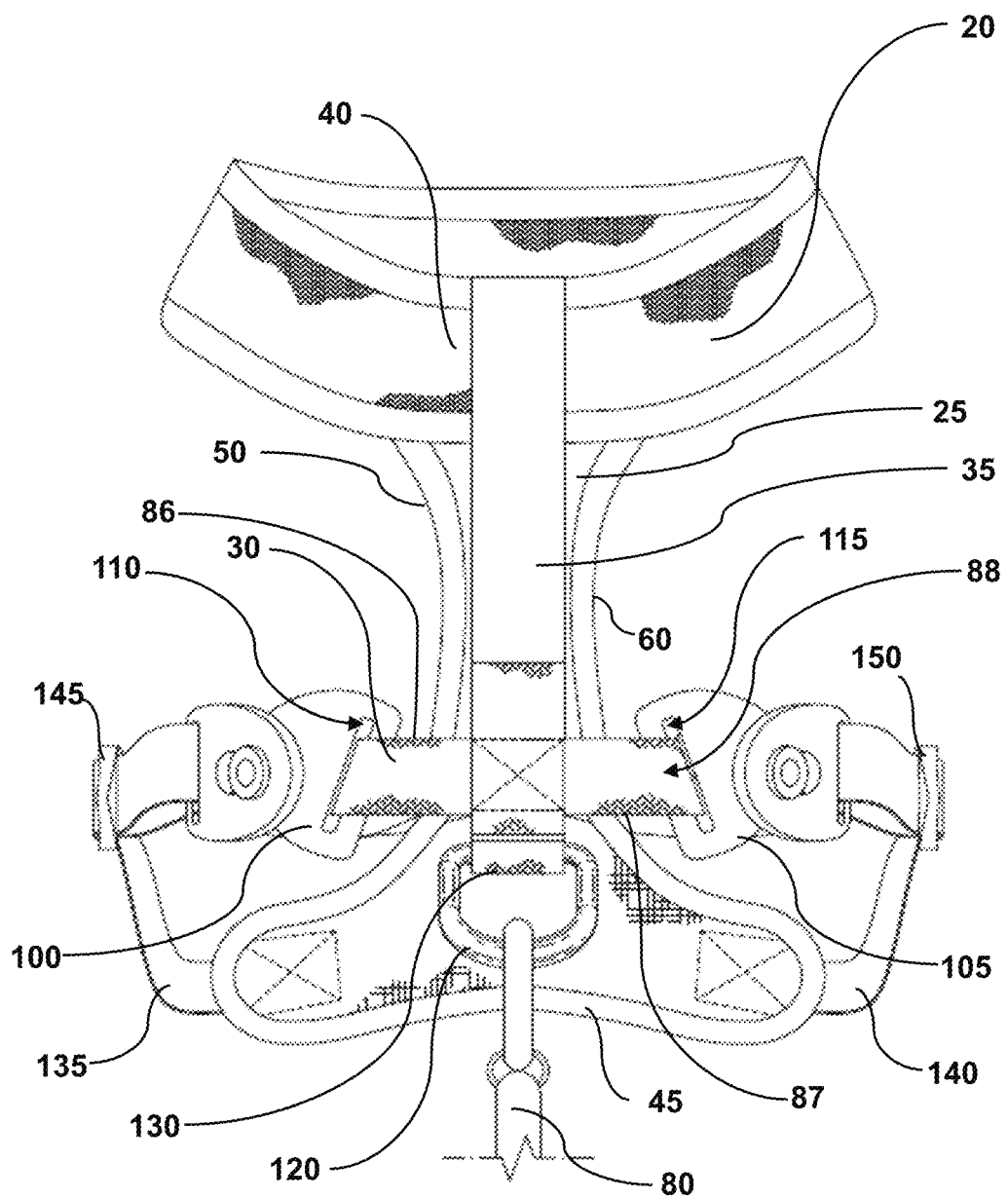
FIG. 2 is a top view of the harness for an animal.

As shown in FIGS. 1-4, a harness 10 for an animal 15 (see FIG. 4) presented herein has a collar 20, a sternum cover 25, a closed loop 30, and a link 35 connecting an upper section 40 of the collar 20 and the closed loop 30. The link 35 may be in the form of a strap. In fact, a strap may be a cord, a leather, corded strip, band, a flattened string, denim, fabric, nylon, flexible plastic, string, or other strapping means used in harnesses for animals.

As shown in FIGS. 1-4, the sternum cover 25 extends from the collar 20 to a sternum-cover end 45. The right side 50 of the sternum cover 25 has a right extension 55, and the left side 60 of the sternum cover 25 has a left extension 65. The right extension 55 is connected to the closed loop 30 and the left extension 65 is also connected to the closed loop 30. The closed loop 30 is made of a flexible material enabling the closed loop 30 to change its shape when pulled or pushed. Thus, the closed loop 30 may be a closed loop cord, leather, corded strip, band, flattened string, denim, fabric, nylon, flexible plastic, string, or other strong flexible closed loop means used in harnesses for animals.

Figure 3:
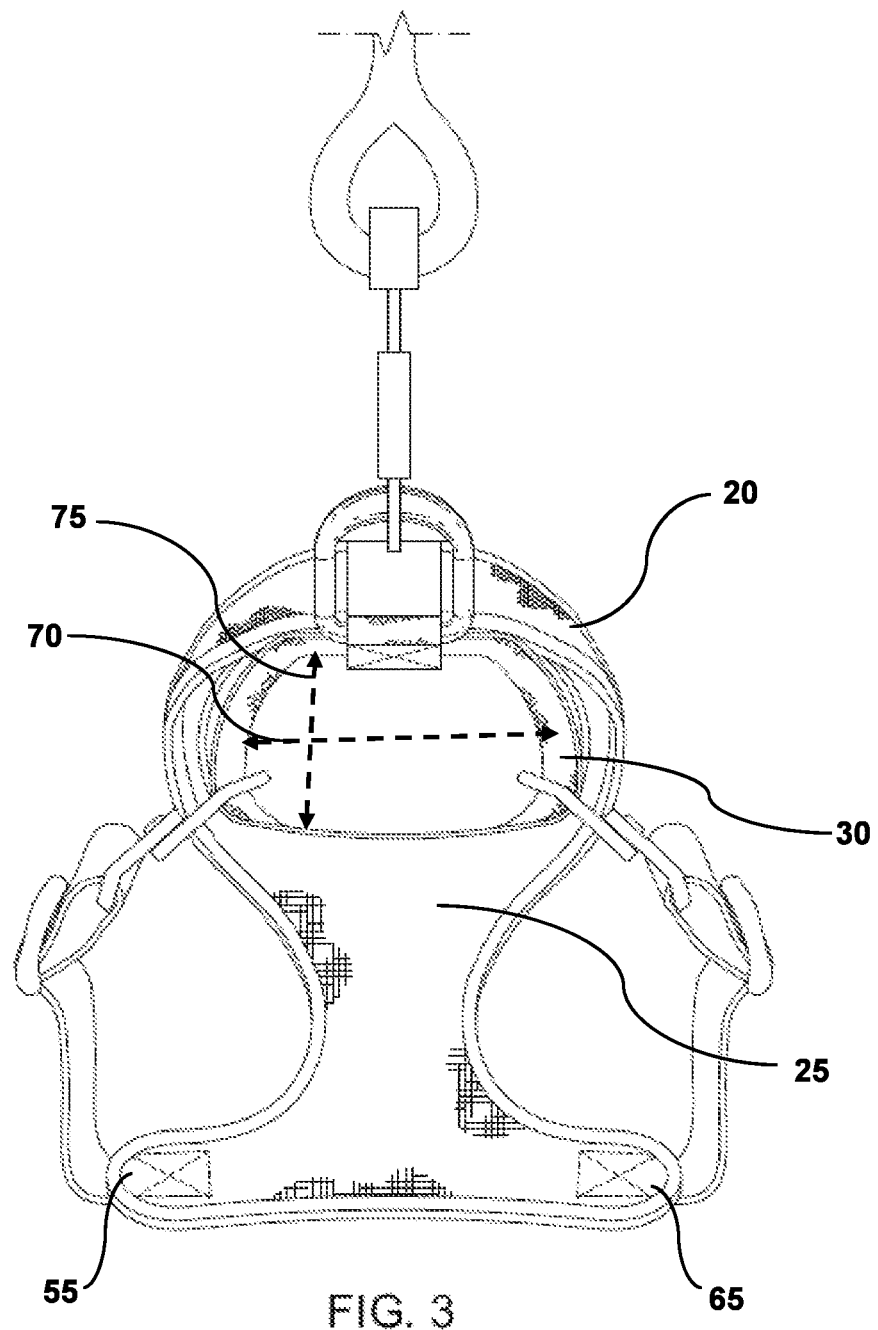
FIG. 3 is a rear view of the harness for an animal.
Figure 4:
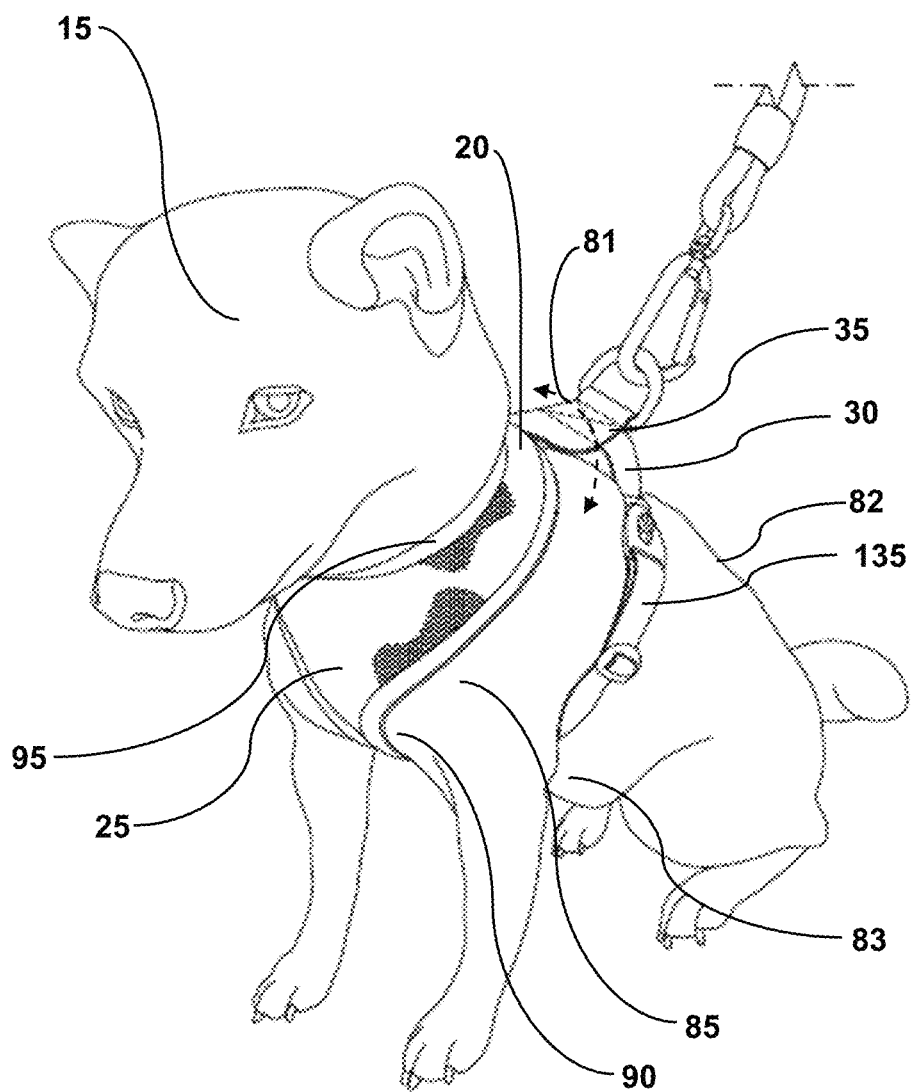
FIG. 4 is the harness for an animal worn by a pet.

The flexible closed loop 30 is thus able to have a varying loop width 70 and a varying loop height 75 (both shown in FIG. 3). When a leash 80 attached to the closed loop is not pulled tight, the closed loop 30 is relaxed and the closed loop 30 flattens, making the loop width 70 wider (making the loop height 75 shorter), making the entire harness 10 loosely fit on the animal 15. When the leash 80 attached to the closed loop 30 is pulled tight, the closed loop 30 is pulled and the closed loop 30 elongates towards the pulling force, making the loop width 70 narrower (making the loop height 80 longer), making the entire harness 10 tightly fit on the animal 15.

Wherein the closed loop has a loop width and a loop height, wherein the loop width runs along a torso line 81 that is perpendicular to a vertebral column 82 of the animal 15, and wherein the loop width and the loop height are variable pending whether the leash is pulled or is resting so that when a leash attached to the closed loop is not pulled the loop width perpendicular to a vertebral column to loosen the right extension 55 and the left extension 65 around an underside 83 of the animal 15 and when the leash is pulled the loop width 70 decreases perpendicular to a vertebral column to pull the right extension 55, the sternum cover 25, and the left extension 65 against and around the underside 83 of the animal 15.

Because the closed loop 30 is relaxed (at the rest state or when the leash is not pulled) and as the closed loop 30 flattens, making the loop width 70 wider while making the loop height 75 shorter, when the leash 80 is not pulled, the harness 10 is relaxedly fit over the animal 15 and the harness 10 hardly put any binding force on the animal 15, making the animal 15 comfortable. However, when the leash 80 is pulled, the closed loop 30 is pulled and the closed loop 30 elongates towards (upwards) the pulling force, making the loop width 70 narrower while making the loop height 75 longer, making the entire harness 10 tightly fit on the animal 15, pulling on the upper torso 85 above the sternum 90, on the sternum 90, or the upper torso 85 below the sternum 90 of the animal 15, controlling and restraining the animal 15 without choking the animal 15.

One variation to the close loop is that the close loop has a front edge 86 and a rear edge 87 so that the front edge 86 is towards the collar 20 and the front edge 86 is shorter in length than the rear edge 87, forming a trapezoidal shape 88 when viewed from above the harness when worn by the animal, so that one or both the right tab opening 110 and the left tab opening 115 leans toward the collar 20 to better accommodates the shape of the animal 15.

One advantage of the embodiment presented herein is that although the harness 10 has a collar 20 around the neck of the animal 15, most of the controlling force of a pull does not choke the animal 15. Because the pulling force is distributed over the upper torso 85 (or over the sternum 90), the pulling force is well distributed over the animal's body, minimizing any choking, minimizing the harness 10 or collar 20 digging into the body of the animal 15 due to the pressure getting concentrated at any one point.

The right side 50 of the sternum cover 25 and the left side 60 of the sternum cover 25, from the collar 20 gradually come closer to each other in an unfolded state (the sternum cover width narrows) and then gradually goes further apart (the sternum cover width increases) in an unfolded state, forming the right extension 55 and the left extension 65 at the sternum-cover end 45, respectively.

A right tab 100 and a left tab 105 are attached to the closed loop 30 so that the right extension 55 attaches to the right tab 100 and the left extension 65 attaches to the left tab 105. The right tab 100 and the left tab 105 are slidably attached to the closed loop 30 so that either or both the right tab 100 and the left tab 105 slide along the closed loop 30. The right tab 100 has a right tab opening 110 and the left tab 105 has a left tab opening 115 so that the closed loop 30 is inserted through both the right tab opening 110 and the left tab opening 115 so that either or both the right tab 100 and the left tab 105 easily slide along the closed loop 30.

To better accommodate the leash 80, a ring 120 is attached to the link 35 or to the loop 30 so that a leash 80 can be attached to the ring 120. One embodiment has the link 35 with a hole 125 formed at an extremity 130 of the link 35, away from the collar 20 and next to the closed loop 30. A part of the ring 120 is inserted through the hole 125 and the ring 120 is free to rotate about the hole 125. The link 35 may be formed into an upper link 136 and a lower link 137, having two separate links to potentially have different length for the upper link 136 and the lower link 137. An example would be the upper link 136 longer than the lower link 137, forming a gap 138 between the upper link 136 and the lower link 137.

Various versions of the harness 10 are available. An embodiment of the harness 10 for an animal 15 has a right strap 135 attached to the right extension 55 and a left strap 140 attached to the left extension 65. In this embodiment, the right strap 135 attached to the right extension 55 may be removably attached to the right tab 100, and the left strap 140 attached to the left extension 65 is removably attached to the left tab 105.

An embodiment of the harness 10 for an animal 15 may also have the right strap 135 with a right buckle 145 used to adjust length of the right strap 135 and the left strap 140 with a left buckle 150 used to adjust length of the left strap 140. The right buckle 145 and the left buckle 150 are used to adjust the size (looseness or tightness) of the harness 10 to comfortably fit the animal 15.

While the description, drawings, and references have presented, shown, and described with reference to different embodiments thereof, it will be appreciated by those skilled in the art that variations in form, detail, compositions, and operation may be made without departing from the spirit and scope of the disclosure.

What is claimed is:

1. A harness for an animal comprising: a collar, a sternum cover, a closed loop, and a link connecting an upper section of the collar and the closed loop, wherein the closed loop has a loop width and a loop height, wherein the loop width runs along a torso line that is perpendicular to a vertebral column of the animal, and wherein the loop width and the loop height are variable pending whether the leash is pulled or is resting so that when a leash attached to the closed loop is not pulled the loop width increases perpendicular to a vertebral column to loosen a right extension and a left extension around an underside of the animal and when the leash is pulled the loop width decreases perpendicular to a vertebral column to pull the right extension, the sternum cover, and the left extension against and around the underside of the animal, wherein the sternum cover extends from the collar to a sternum-cover end, wherein the right extension is attached to a right side of the sternum cover and the right extension is attached to a left side of the sternum cover, wherein the right extension is connected to the closed loop and the left extension is connected to the closed loop, wherein a right tab and a left tab are attached to the closed loop so that the right extension is connected to the closed loop by the right tab and the left extension is connected to the closed loop by the left tab, and wherein either or both the right tab and the left tab are slidably attached to the closed loop to slide along the closed loop.

2. The harness for an animal of claim 1,
wherein the right tab has a right tab opening and the left tab has a left tab opening so that the closed loop is inserted through both the right tab opening and the left tab opening so that either or both the right tab and the left tab slide along the closed loop.

3. The harness for an animal of claim 2,
wherein a ring is attached to the link or to the closed loop so that a leash can be attached to the ring.

4. The harness for an animal of claim 3,
wherein the link has a hole formed at an extremity of the link, away from the collar and next to the closed loop, so the ring is inserted through the hole and the ring is free to rotate about the hole.

5. The harness for an animal of claim 4,
wherein the link comprises of an upper link and a lower link and the link covers an entire collar width and an entire closed loop width.

6. The harness for an animal of claim 4,
wherein a right strap is attached to the right extension and a left strap is attached to the left extension, wherein the right strap has a right buckle used to adjust length of the right strap and the left strap has a left buckle used to adjust length of the left strap, wherein the link comprises of an upper link and a lower link and the link covers an entire collar width and the entire loop width, and wherein the upper link is longer than the lower link to form a gap between the upper link and the lower link.

7. The harness for an animal of claim 2,
wherein the collar is an enclosed circular shape forming an entry for a head of an animal.

8. A harness for an animal comprising: a collar, a sternum cover, a closed loop, and a link connecting an upper section of the collar and the closed loop, wherein the closed loop has a loop width and a loop height, wherein the loop width runs along a torso line that is perpendicular to a vertebral column of the animal, and wherein the loop width and the loop height are variable pending whether the leash is pulled or is resting so that when a leash attached to the closed loop is not pulled the loop width increases perpendicular to a vertebral column to loosen a right extension and a left extension around an underside of the animal and when the leash is pulled the loop width decreases perpendicular to a vertebral column to pull the right extension, the sternum cover, and the left extension against and around the underside of the animal, wherein the closed loop has a front edge and a rear edge, wherein the front edge is towards the collar and the front edge is shorter in length than the rear edge, forming a trapezoidal shape when viewed from above the harness when worn by the animal, so that one or both a right tab opening and a left tab opening leans toward the collar to better accommodate the shape of the animal, wherein the sternum cover extends from the collar to a sternum-cover end, wherein the right extension is attached to a right side of the sternum cover and the right extension is attached to a left side of the sternum cover, wherein the right side of the sternum cover and the left side of the sternum cover, from the collar gradually come closer to each other in an unfolded state and then gradually goes further apart in an unfolded state, forming the right extension and the left extension, respectively, wherein the right extension is connected to the closed loop and the left extension is connected to the closed loop, wherein the closed loop is made of a flexible material enabling the closed loop to change its shape when pulled or pushed, wherein a right tab and a left tab are attached to the closed loop so that the right extension is connected to the closed loop by the right tab and the left extension is connected to the closed loop by the left tab, and wherein either or both the right tab and the left tab are slidably attached to the closed loop to slide along the closed loop.

9. The harness for an animal of claim 8,
wherein the right tab has a right tab opening and the left tab has a left tab opening so that the closed loop is inserted through both the right tab opening and the left tab opening so that either or both the right tab and the left tab slide along the closed loop.

10. The harness for an animal of claim 9,
wherein a ring is attached to the link or to the closed loop so that a leash can be attached to the ring.

11. The harness for an animal of claim 10,
wherein the link has a hole formed at an extremity of the link, away from the collar and next to the closed loop, so the ring is inserted through the hole and the ring is free to rotate about the hole.

12. The harness for an animal of claim 11,
wherein the link comprises of an upper link and a lower link and the link covers an entire collar width and an entire closed loop width.

13. The harness for an animal of claim 9,
wherein a right strap is attached to the right extension and a left strap is attached to the left extension, wherein the right strap has a right buckle used to adjust length of the right strap and the left strap has a left buckle used to adjust length of the left strap, wherein the link comprises of an upper link and a lower link and the link covers an entire collar width and the entire loop width, and wherein the upper link is longer than the lower link to form a gap between the upper link and the lower link.

14. The harness for an animal of claim 9,
wherein the collar is an enclosed circular shape forming an entry for a head of an animal.

* * * * *